United States Patent
Mitsutake et al.

[11] Patent Number: 6,003,086
[45] Date of Patent: Dec. 14, 1999

[54] DATA TRANSMISSION APPARATUS FOR CONTROLLING CONTENTION BETWEEN DATA TRANSMISSIONS OF A PLURALITY OF TYPES OF APPLICATIONS BY SETTING TRANSMISSION INTERNAL ACCORDING TO EACH APPLICATION BANDWIDTH REQUIREMENT

[75] Inventors: Katsuya Mitsutake; Yasutoshi Maeda, both of Nakai-machi, Japan

[73] Assignee: Fuji Xerox Co., Ltd., Tokyo, Japan

[21] Appl. No.: 08/863,572

[22] Filed: May 27, 1997

[30] Foreign Application Priority Data

May 30, 1996 [JP] Japan .................................. 8-137249

[51] Int. Cl.⁶ .................................................. G06F 15/16
[52] U.S. Cl. .......................... 709/229; 709/226; 709/227; 709/228; 370/397; 370/412; 370/230; 370/462; 370/229
[58] Field of Search .................................... 370/229, 237, 370/397, 412, 230, 462, 13, 17, 60; 395/200.62, 200.63, 200.57, 200.58, 200.64, 200.68; 709/227, 224, 228, 229

[56] References Cited

U.S. PATENT DOCUMENTS 5,581,544 12/1996 Hamada et al. ........................ 370/253
5,629,928 5/1997 Calvnac et al. ........................ 370/237

FOREIGN PATENT DOCUMENTS

| 198847 | 9/1986 | Japan . |
| 61-198847 | 9/1986 | Japan . |
| 4-84248 | 3/1992 | Japan . |
| 227193 | 9/1993 | Japan . |
| 5-227193 | 9/1993 | Japan . |

Primary Examiner—Dung C. Dinh
Assistant Examiner—Hieu C. Le
Attorney, Agent, or Firm—Oliff & Berridge, PLC

[57] ABSTRACT

A data transmission apparatus in which the bandwidth necessary for an application is determined and is communicated to a transmission interval counting function. The transmission interval counting function determines a transmission interval according to the necessary bandwidth and effects transmit control on a transmission unit transmitting function with timing set at this transmission interval so as to transfer data in a desired bandwidth. Owing to the above construction, even when a plurality of types of applications for transmitting data at desired times exist and they perform data transmissions while sharing the use of a network, the contention between the data transmissions in the network can be prevented from occurring. This prevents data losses and delays in data transmission from increasing.

20 Claims, 15 Drawing Sheets

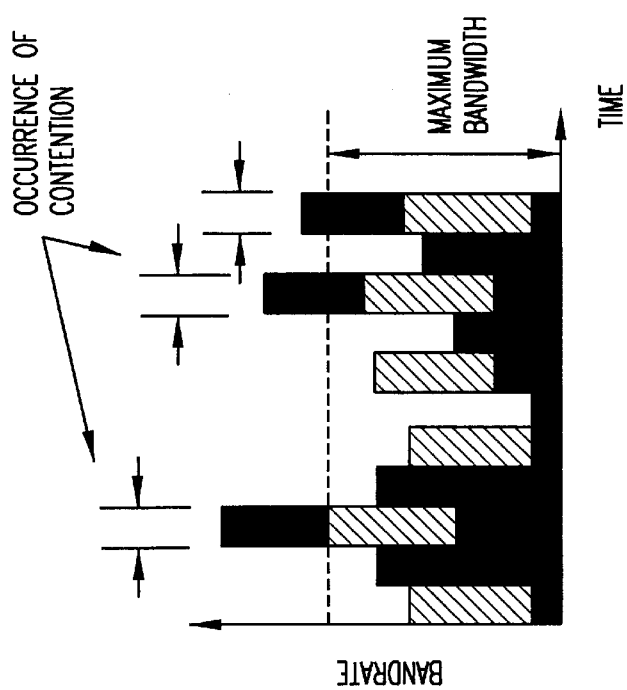
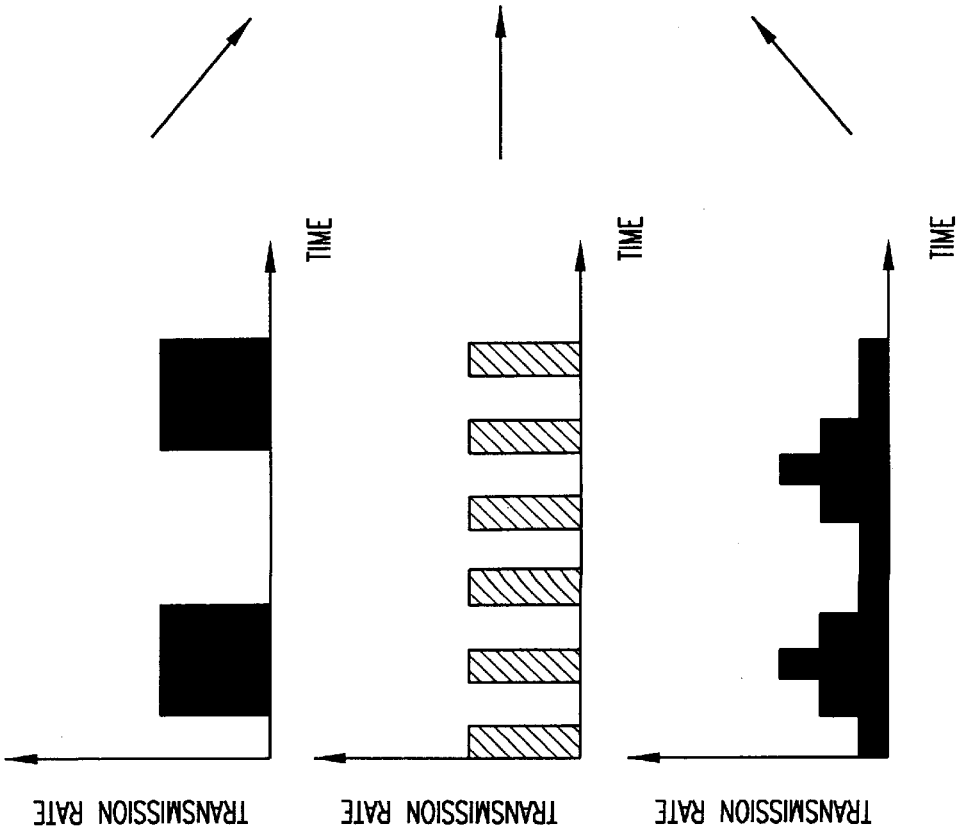
FIG. 2
PRIOR ART

| | | | | |
|---|---|---|---|---|
| INFORMATION FOR DATALINK LAYER ||||| 
| VERS | LEN | TYPE OF SERVICE | TOTAL LENGTH ||
| IDENT ||| FLAGS | FRAGMENT OFFSET |
| TIME || PROTO | HEADER CHECKSUM ||
| SOURCE IP ADDRESS |||||
| DESTINATION IP ADDRESS |||||
| OPTIONS |||| PADDING |
| SOURCE PORT |||| DESTINATION PORT |
| SEQUENCE NUMBER |||||
| ACKNOWLEDGEMENT NUMBER |||||
| OFF. | RES. | CODE | WINDOW ||
| CHECKSUM |||| URGENT POINT |
| OPTIONS |||| PADDING |
| INFORMATION FOR UPPER-LAYER PROTOCOL |||||

IP LAYER (rows 1–7), TCP LAYER (rows 8–14)

EXAMPLES OF CONNECTION AND PROTOCOL SPECIFICATION: TCP/IP

FIELD OF IP LAYER)  PROTO: UPPER-LAYER PROTOCOL IDENTIFIER (ex, TCP-6)
SOURCE IP ADDRESS: TRANSMITTING STATION IP ADDRESS
DESTINATION IP ADDRESS: RECEIVING STATION IP ADDRESS

FIELD OF TCP LAYER)  SOURCE PORT: TRANSMIT PORT NUMBER
DESTINATION PORT: RECEIVE PORT NUMBER

FIG.9

| TYPE OF PROTOCOL | NECESSARY BANDWIDTH |
|---|---|
| MAILING | 1M(bps) |
| TELNET | 400K(bps) |
| FILING | 10M(bps) |
| PRINTING | 100M(bps) |
| REMOTE PROCEDURE CALL | 1M(bps) |
| ⋮ | ⋮ |

FIG.10

| CONNECTION NUMBERS | NECESSARY BANDWIDTH |
|---|---|
| 1 | 1M(bps) |
| 2 | 400K(bps) |
| 3 | 10M(bps) |
| 4 | 100M(bps) |
| 5 | 1M(bps) |
| ⋮ | ⋮ |

FIG.16

DATA TRANSMISSION APPARATUS FOR CONTROLLING CONTENTION BETWEEN DATA TRANSMISSIONS OF A PLURALITY OF TYPES OF APPLICATIONS BY SETTING TRANSMISSION INTERNAL ACCORDING TO EACH APPLICATION BANDWIDTH REQUIREMENT

BACKGROUND OF THE INVENTION

1. Field of the Invention

The present invention relates to a data transmission apparatus for controlling contention between data transmissions when a plurality of types of applications for transmitting data at arbitrary times exist and they transmit the data while sharing the use of a network.

2. Description of the Related Art

A plurality of applications generally operates on the same network. FIG. 1 is a diagram for describing the use condition of such applications. In the same drawing, a plurality of data transmission apparatuses 101 are electrically connected to a transmitting medium 100. Applications such as print, electronic mails, file transfer, telnets, etc. make use of the transmitting medium 100 through the data transmission apparatuses 101. Of these applications, applications incapable of predicting the condition of its own data transmission also exist as in the case of, for example, a telnet and an electronic mail in which human interaction serves as a source for the transmission of data. Thus, in such a network, a plurality of terminals start to transmit data at arbitrary times and there is a probability of occurrence of the contention between data transmissions.

The contention between the data transmissions will first be explained with reference to FIG. 2. Each terminal transmits data through a transmitting medium constituting a network. A transmission rate indicative of the capability of transmission of data is expressed in the form of the amount of transmitted data per unit time. The transmission bandwidth of the transmitting medium has its limitations and the maximum transmission bandwidth (hereinafter called "Rmax (bit/sec)") thereof is a fixed finite value.

The transmission rate (hereinafter called "r(t)") at which the bandwidth is used for the transmission of data by each application, shares the use of a network by using Rmax in divided form. r(t) changes every moment. When the sum of r(t): $\Sigma r(t)$ is greater than Rmax of the transmitting medium, a struggle for the common bandwidth occurs between respective data transmissions. This will be referred to as "contention".

Data, which needs a bandwidth exceeding Rmax, will be lost without transmission. In order to avoid the loss of the data, control for avoiding the contention, i.e., contention control is performed.

The conventional contention control will next be described. In general, each of transmitting stations puts predetermined amounts of data together into a transmission unit and transmits the data for each transmission unit. A packet or cell or the like is known as the transmission unit. When respective data transmissions contend with each other at a transmitting medium upon execution of the respective data transmissions, the occurrence of its contention is notified tothetransmitting stations forperformingthe individual-data transmissions. Each of such transmitting stations extends a transmission interval of the continuous transmission unit so as to reduce r(t). As a result, $\Sigma r(t)$ becomes smaller than Rmax, so that the loss of the data can be avoided. As typical techniques for contention control, there ares known a CSMA/CD (Carrier Sense Multiple Access/Collision Detection) system of Ethernet (Trademark of Xerox Corporation), a system using a RM cell (Resource Management Cell) employed in ABR (Available Bit Rate) service of an ATM (Asynchronous Transfer Mode), etc.

Features of the prior art will next be explained. In the conventional contention control technique, Rmax is available without any waste because the bandwidth is dynamically distributed to a transmission actually using the bandwidth. On the one hand, however, a bandwidth available for transmission at a given time t is-expressed as $R(t)=|Rmax - \Sigma r(t)|$. On the other hand, it is necessary to control a bandwidth r (t) used for transmission and control $|R(t)-r(t)|$ so as to approach zero. At this time, there may be a case in which r(t) is controlled excessively and deficiently as shown in FIG. 3.

Where $R(t)-r(t)>0$ (excessively large in controlled variable)

The contention occurs for the transmission bandwidth. In general, the excess of the controlled variable is absorbed by buffering data before and after the use of a transmitting medium and averaging used bandwidths on a time basis. However, when the amount of data producedndue to the excess of the controlled variable is greater than the amount of buffering, the data will be lost. Even when a buffer length is sufficiently long, a delay in the data transmission due to the buffering increases.

Where $R(t)-r(t)<0$ (excessively small in controlled variable):

A bandwidth unused for transmission occurs and hence the utilization efficiency of the bandwidth is reduced.

The reason why r(t) is controlled excessively or deficiently, will next be described.

A distance L exists between a point where r(t)-r(t) is observed and a point where r(t) is controlled in accordance with notification of observations results. Upon the propagation of the notification between the two, a delay of $\Delta t=$(light velocity c×distance L) exists even at the minimum. Namely, r(t) is always controlled in accordance with R(t)-r(t) preceding $\Delta t$. Thus, since $\Delta t \neq 0$ even if the accurate observation or notification is made, it is impossible to perform control for satisfying $|R(t)-r(t)|=0$.

In the conventional contention control technique as described above, the longer the distance of a transmission path is, the wider a control error of $|R(t)-r(t)|$ becomes. As the transmission rate $\Sigma r(t)$ approaches Rmax of the transmission bandwidth, no margin of absorption of the control error of $|R(t)-r(t)|$ is given, so that a data loss and a data transmission delay increase due to the occurrence of contention.

Meanwhile, the bandwidth and the amount of data to be transmitted, which are necessary for the establishment of an application, differ according to the type of application. For example, a telnet needs a bandwidth for transmitting a few hundred Bytes in several seconds, an electronic mail needs a bandwidth for transmitting a few KBytes in a few minutes, and print needs a bandwidth for transmitting a few hundred KBytes in a few seconds. Thus, since the data transmitted from each application is several hundred Bytes or more and is sufficiently larger than the transmission unit, it is divided into plural transmission units, which are continuously transmitted. Since an apparatus for actually transmitting data or a transmission protocol permits the transmission of data of any applications, there has normally been a demand for the transmission of data as high in speed as possible according to applications requiring broad bandwidths. Therefore, the transmission interval for each transmission unit tends to be narrowed unlimitedly and r(t) comes to reach Rmax.

In the conventional contention control technique, a problem occurs such that if plural terminals starts to transmit data at the rates reaching Rmax, the data loss and the delay in the data transmission increase as described above.

With the notification of the contention, the r(t) decreasing operation is evenly effected on all the transmitting stations without regard to the type of application. Thus, once dathe contention occurs, the problem of a great reduction in quality arises in the applications requiring large transmission bandwidth, such as a printing application.

SUMMARY OF THE INVENTION

With the foregoing in view, it is therefore an object of the present invention to previously prevent the occurrence of contention between data transmissions and prevent increases in data loss and data transmission delay even when plural types of applications for transmitting data at arbitrary times exist and they perform the data transmissions while sharing a network.

According to the present invention, for achieving the above object, each of transmitting stations controls the use of a bandwidth prior to the transmission of data in conformity to a bandwidth necessary for each application to thereby avoid undesired contention between the data transmissions.

That is, according to the present invention, a data transmission apparatus is provided with necessary bandwidth recognizing means for recognizing transmission bandwidths necessary for each of applications, and data transmitting means for adjusting a transmit interval for each continuous transmission unit so as to provide a transmission bandwidth necessary for a corresponding application upon the transmission of data by the application.

According to the construction referred to above, assignment can be controlled so as to allocate a small bandwidth, for example, corresponding to the applications, so that the contention for the bandwidth can be restrained.

In the above-described construction as well, the transmission bandwidth necessary for the application may be determined depending on the type of protocol, the input of the application by a user or the throughput of the application.

When plural applications transmit data simultaneously, the bandwidth necessary for the above application can be determined according to the type of protocol or a connection number. Further, the use of the connection number can be applied even at the case in which the plural applications simultaneously use the same protocol.

BRIEF DESCRIPTION OF THE DRAWINGS

FIG. 2 is a diagram for describing contention between transmissions in the network shown in FIG. 1;

FIG. 9 is a diagram showing a specific construction of the transmitted data shown in FIG. 8;

FIG. 10 is a diagram for explaining a necessary bandwidth storing function of the necessary bandwidth recognizing means employed in the first embodiment;

FIG. 16 is a diagram for describing a necessary bandwidth storing function of the necessary bandwidth recognizing means employed in the second embodiment.

DETAILED DESCRIPTION OF THE PREFERRED EMBODIMENTS

Figure 1:
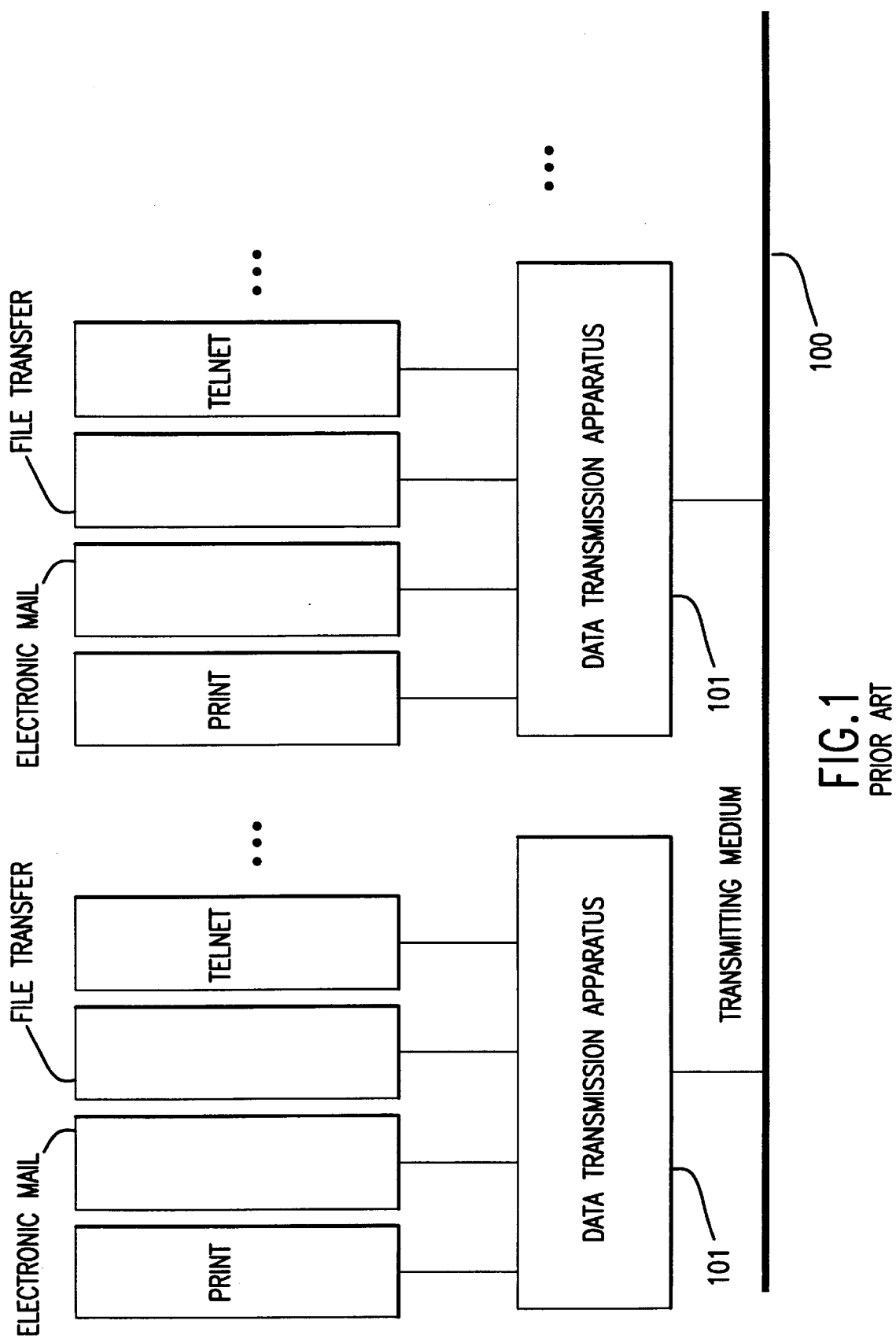
FIG. 1 is a diagram for describing a configuration of a network in which a plurality of applications are operated.
Figure 3:
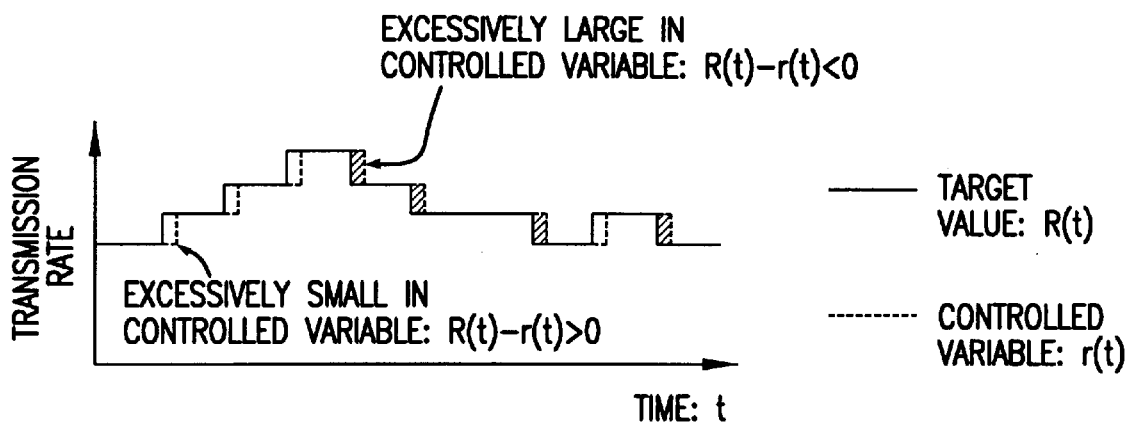
FIG. 3 is a diagram for describing errors occurring in transmission control of the network.
Figure 4:
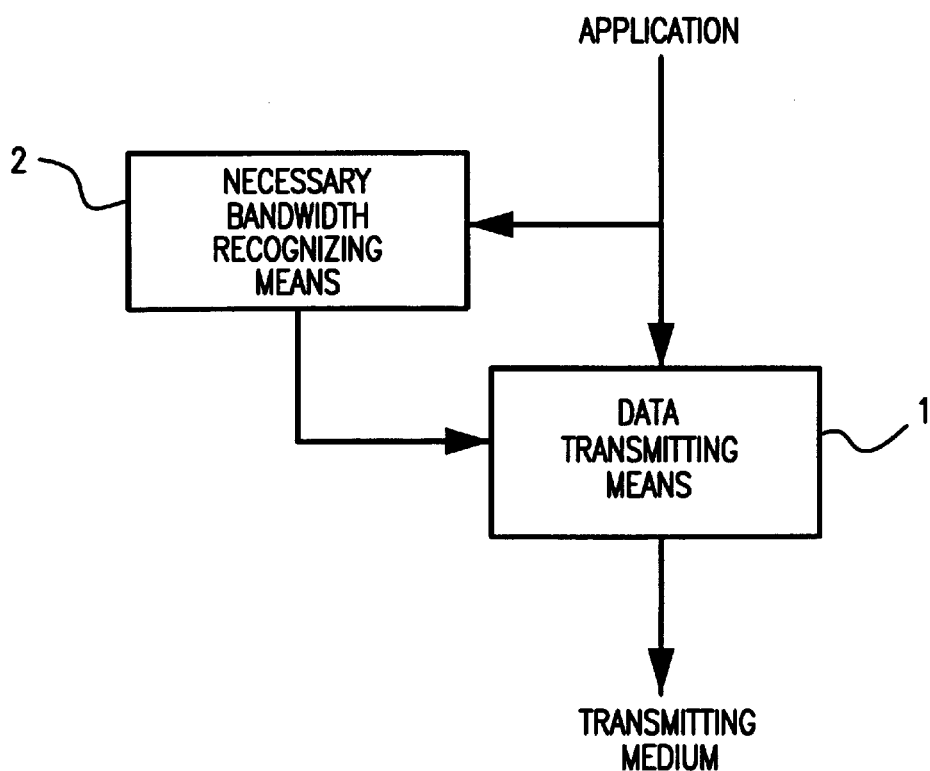
FIG. 4 is a block diagram showing a basic configuration of the present invention.

A configurational example of the principle of the present invention will first be described. FIG. 4 shows the configurational example of the principle of the present invention. In the drawing, a data transmission apparatus or equipment has data transmitting means 1 and a necessary bandwidth recognizing means 2. The necessary bandwidth recognizing means 2 corresponds to means for recognizing a transmission bandwidth necessary for each application. The necessary bandwidth recognizing means 2 notifies the result of recognition to the data transmitting means 1. The data transmitting means 1 adjusts a transmit interval for each of the continuous transmission units so as to become the bandwidth notified from the necessary bandwidth recognizing means 2 upon the transmission of data of the corresponding application and transmits the so-processed data therefrom.

Preferred embodiments of the present invention will hereinafter be described in more details with reference to the accompanying drawings.

[First Embodiment]

Figure 5:
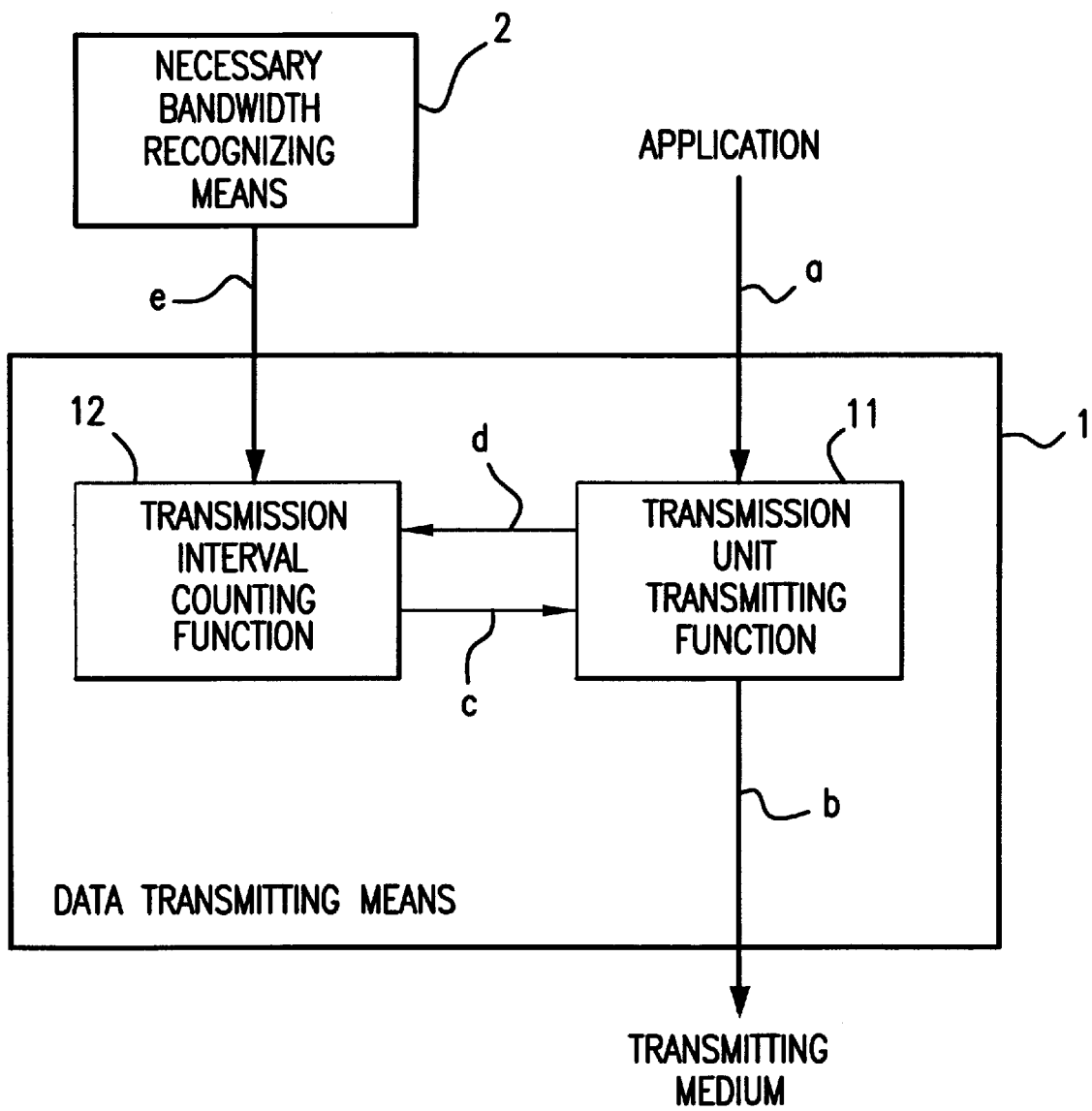
FIG. 5 is a block diagram illustrating data transmitting means employed in a first embodiment of the present invention.

FIG. 5 shows a configuration of a first embodiment with data transmitting means 1 principally as the center. In FIG. 5, a data transmission equipment or apparatus according to the first embodiment has the data transmitting means 1 and a necessary bandwidth recognizing means 2. The data transmitting means 1 has a transmission unit transmitting function 11 and a transmission interval counting function 12. In the present embodiment, the transmission unit transmitting function 11 is used to transmit a transmission unit of a fixed length p (bit). This transmission unit corresponds to, for example, a RM cell for ATM transmission.

The transmission unit transmitting function 11 divides transmission data a inputted thereto from an application into transmission units and sends each divided transmission unit to a transmitting medium according to a signal b for each transmission unit. Each transmission unit is sent to the transmitting medium by each start signal c delivered from the transmission interval counting function 12. The transmission unit transmitting function 11 notifies a transmission end signal d to the transmission interval counting function 12 each time the sending of the transmission unit is completed.

The transmission interval counting function 12 starts to count the time that elapses after the transmit end signal d was received. After the transmission interval counting function 12 has counted the time m (sec), it notifies a start signal c to the transmission unit transmitting function 11. A clock for counting may be arbitrarily selected. A transmitting clock for the transmitting medium or a receiving clock introduced from the transmitting medium or the like is available as the clock, for example.

A description will next be made of how to determine the time m (sec). The necessary bandwidth recognizing means 2 notifies a required or necessary bandwidth B (bit/sec) to the transmission interval counting function 12 through a signal e. Assuming now that the transmission unit length is defined as the fixed length p (bit) and the maximum bandwidth of the transmitting medium is defined as Rmax (bit/sec), m (sec) is given by the following equation:

$$m=(p/B)-(p/Rmax)$$

Figure 6:
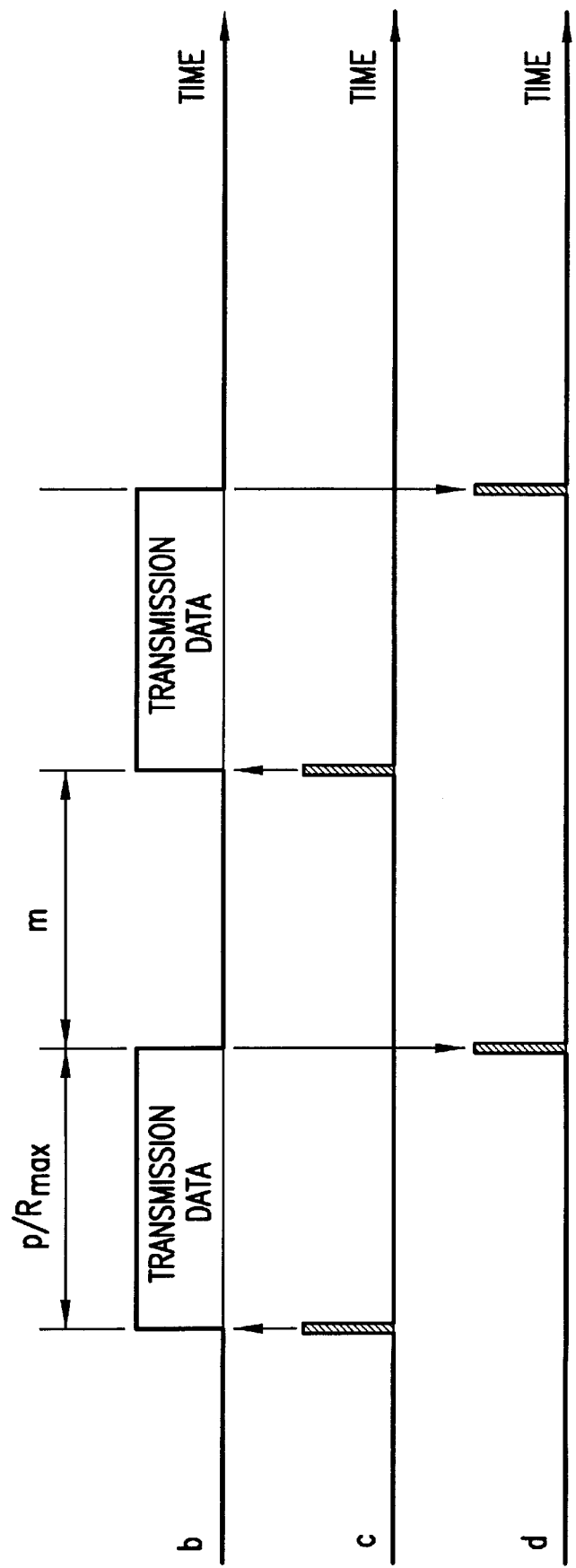
FIG. 6 is a diagram for describing the operation of the data transmitting means shown in FIG. 5.

The above-described operation will be explained with reference to a timing chart shown in FIG. 6. The transmission unit transmitting function 11 that has received a direction of transmission start therein through the signal c, sends data corresponding to the p (bit) therefrom. When the transmission unit transmitting function 11 notifies a transmission end to the transmission interval counting function 12 through the signal d after having sent the data, the transmission interval counting function 12 counts m (sec) and notifies the transmission start to the transmission unit transmitting function 11 through the signal c. This operation is repeated subsequently.

Figure 7:
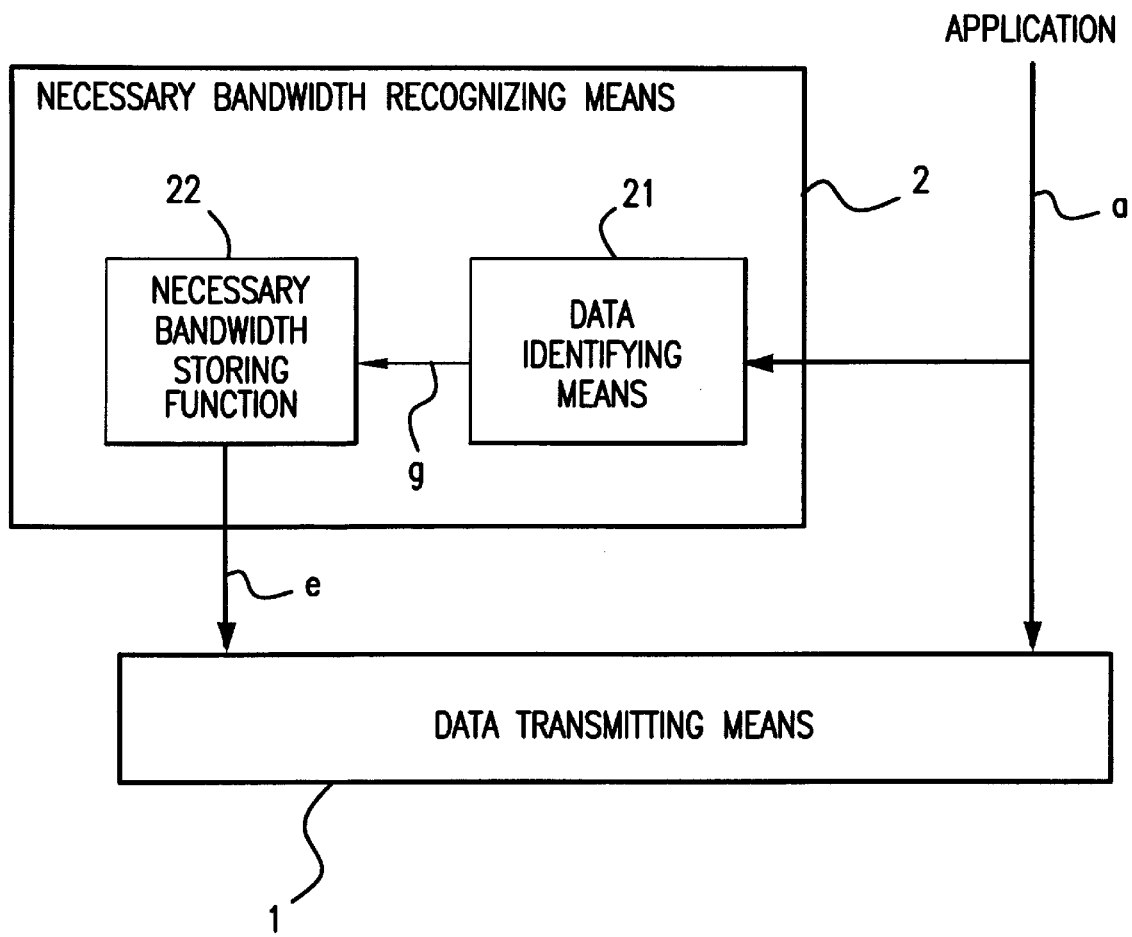
FIG. 7 is a block diagram depicting a configuration of necessary bandwidth recognizing means employed in the first embodiment.

An example of a configuration of the necessary bandwidth recognizing means 2 will next be described with reference to FIG. 7. The necessary bandwidth recognizing means 2 has a data identifying function 21 and a necessary bandwidth storing function 22. The data identifying function 21 monitors the transmission data a delivered from the application and identifies the protocol type of the transmission data a. Thereafter, the data identifying function 21 notifies the result of identification to the necessary bandwidth storing function 22 by a signal g.

Figure 8:
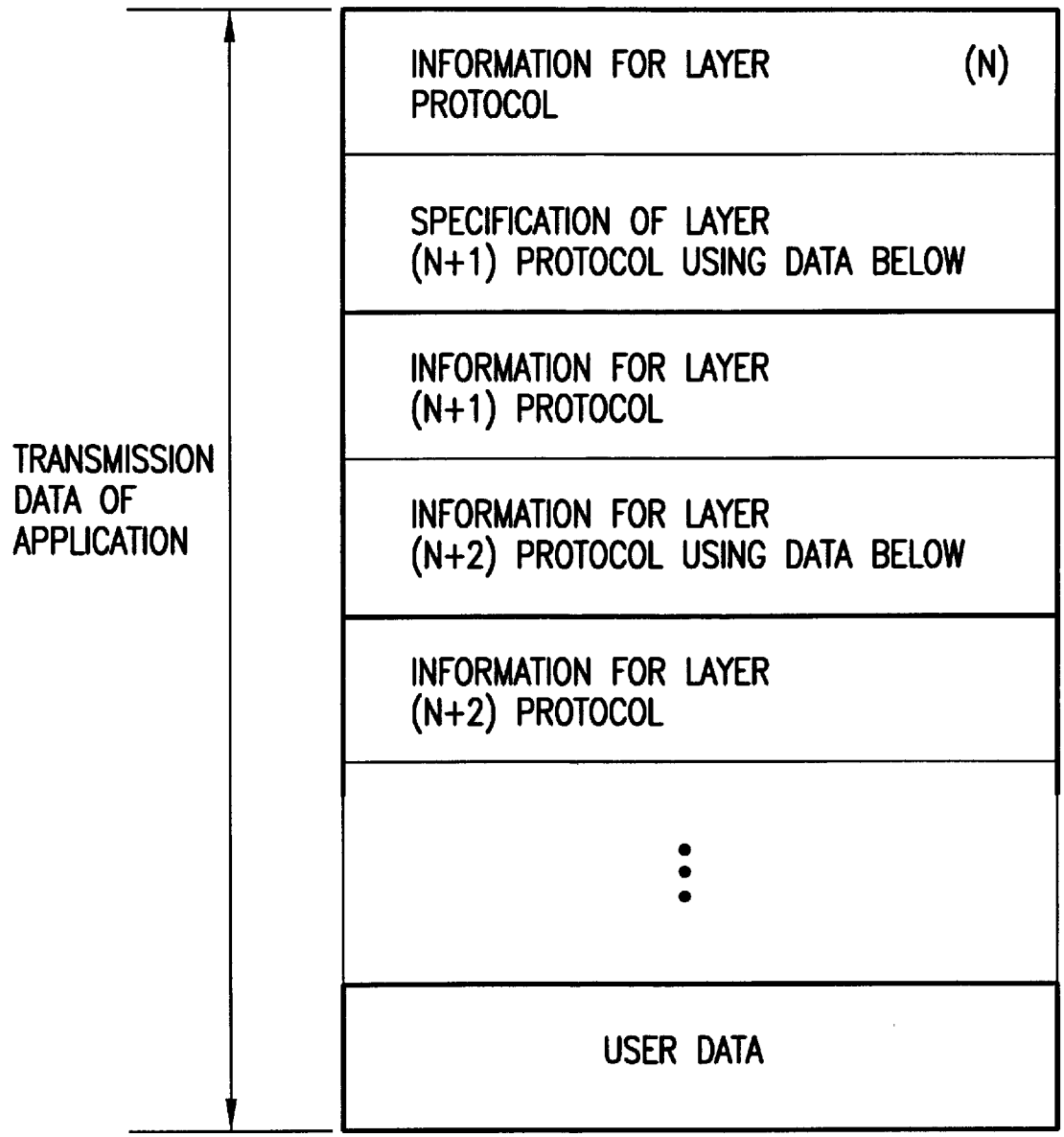
FIG. 8 is a diagram for describing a data recognizing function of the necessary bandwidth recognizing means employed in the first embodiment shows a construction of data to be transmitted.

A method of identifying the protocol type will be described below. Since the transmission data supplied from the application is delivered to a receiving station, using layered protocol functions, the transmission data generally has such a structure as shown in FIG. 8. Namely, information about a layer (N) protocol includes information for specifying a layer (N+1) protocol located above the layer (N) by one layer. For example, FIG. 9 shows a header for TCP/IP as one example of actual transmission data. An IP layer corresponds to a third layer and a TCP layer corresponds to a fourth layer. A field "PROTO" indicative of a protocol used in the fourth layer is defined in the third layer. The position of the field "PROTO" can be specified according to the provisions. When "6" is entered in the field "PROTO", the protocol employed in the fourth layer indicates TCP. Using such a data structure, the data identifying function 21 checks the transmission data a and identifies based on the result of check whether any of the protocols is used for the transmission data.

Since applications such as an electronic mail, a telnet, etc. make use of protocols specialized for the applications, the identification of the protocols is equivalent to the identification of the applications.

The necessary bandwidth storing function 22 has already stored therein a table shown in FIG. 10, which is indicative of the correspondence of the type of protocol and the required bandwidth. When the data identifying function 21 notifies the type of protocol to the necessary bandwidth storing function 22 through the signal g, the necessary bandwidth storing function 22 notifies a necessary bandwidth B corresponding thereto to the data transmitting means 1 by a signal e.

According to the present embodiment as described above, the type of protocol is judged by monitoring the transmission data delivered from the application and the bandwidth necessary for the data transmission is determined based on the result of judgment. Thus, since a small bandwidth may simply be assigned to an application whose transmission rate may be small, the contention for the bandwidth can be controlled.

[Second Embodiment]

Figure 11:
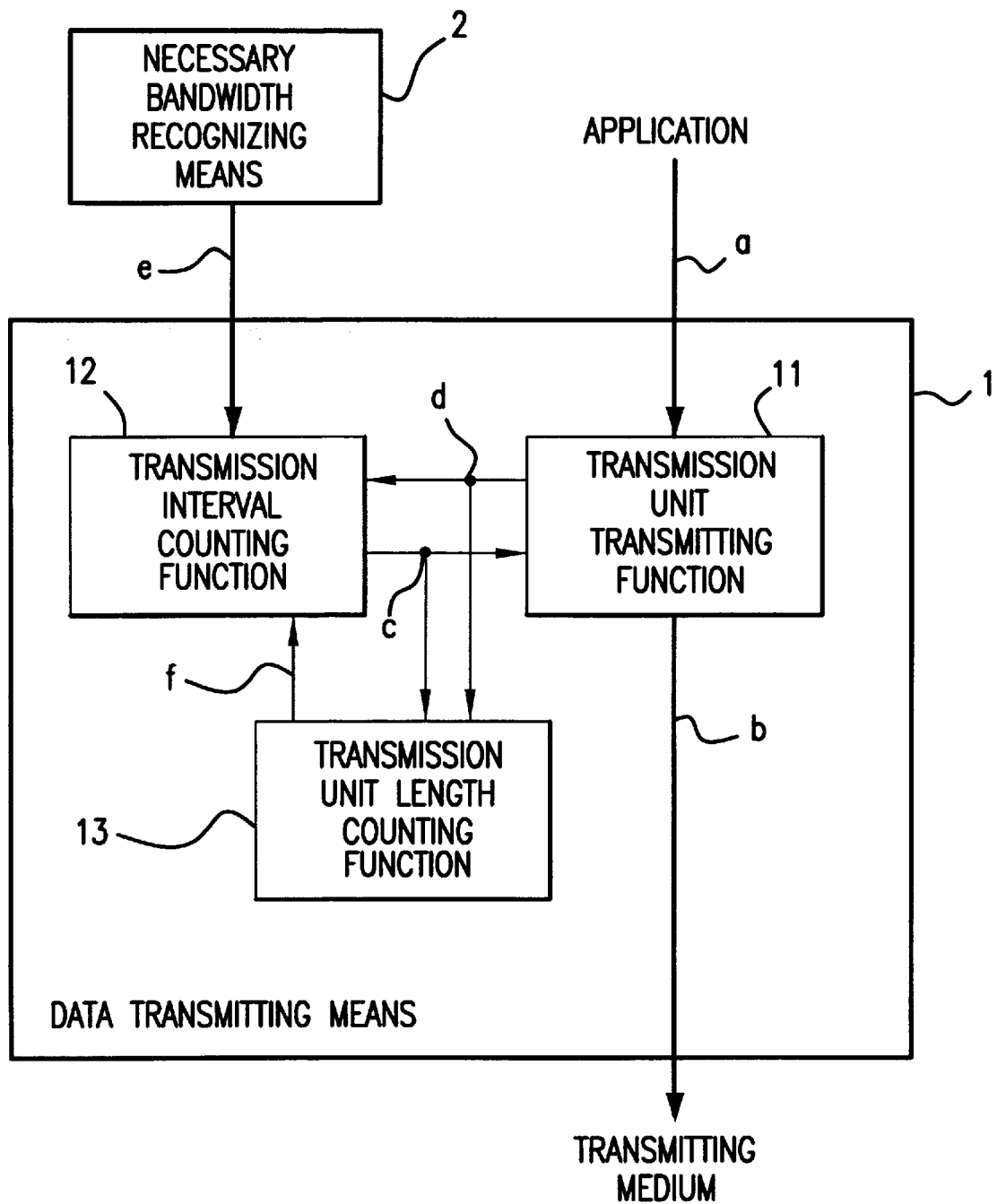
FIG. 11 is a block diagram showing a configuration of data transmitting means employed in a second embodiment of the present invention.

A second embodiment of the present invention will next be described. A data transmission apparatus according to the second embodiment has also data transmitting means 1 and necessary bandwidth recognizing means 2. FIG. 11 shows one example of a configuration of the data transmitting means on a central basis. In the drawing, the data transmitting means 1 has a transmission unit transmitting function 11, a transmission unit length counting function 13 and a transmission interval counting function 12. In the present embodiment, the transmission unit transmitting function 11 serves so as to transmit a transmission unit of an arbitrary length q (bit). This transmission unit corresponds to, for example, a packet for packet communications.

The transmission unit transmitting function 11 divides transmission data a inputted thereto from an application into transmission units and sends each divided transmission unit to a transmitting medium according to a signal b for each transmission unit. Each transmission unit is sent to the transmitting medium each time the transmission unit transmitting function 11 receives a start signal c from the transmission interval counting function 12. The transmission unit transmitting function 11 notifies a transmission end signal d to the transmission unit length counting function 13 each time the sending of the transmission unit is terminated.

The transmission unit length counting function 13 starts counting in response to the start signal c and notifies the result of counting based on the transmission end signal d to the transmission interval counting function 12 as the transmission unit length q (bit) by a signal f. As a clock for counting, a transmitting clock for the transmitting medium is utilized.

When the transmission interval counting function 12 receives the signal f therein as the transmission unit length q (bit), it starts to count the time. After the time m (sec) has been counted, the transmission interval counting function 12 notifies the start signal c to the transmission unit length counting function 13. A clock for counting may be arbitrarily selected. A transmitting clock for the transmitting medium or a receiving clock introduced from the transmitting medium or the like may be available as the clock.

A description will next be made of how to determine the time m (sec). The necessary bandwidth recognizing means 2 notifies a required bandwidth B (bit/sec) to the transmission interval counting function 12 by a signal e. Assuming now that the transmission unit length is defined as q (bit) notified from the transmission interval counting function 12 and the maximum bandwidth of the transmitting medium is defined as Rmax (bit/sec), m (sec) is given by the following equation:

$$m=(q/B)-(q/\mathrm{Rmax})$$

Figure 12:
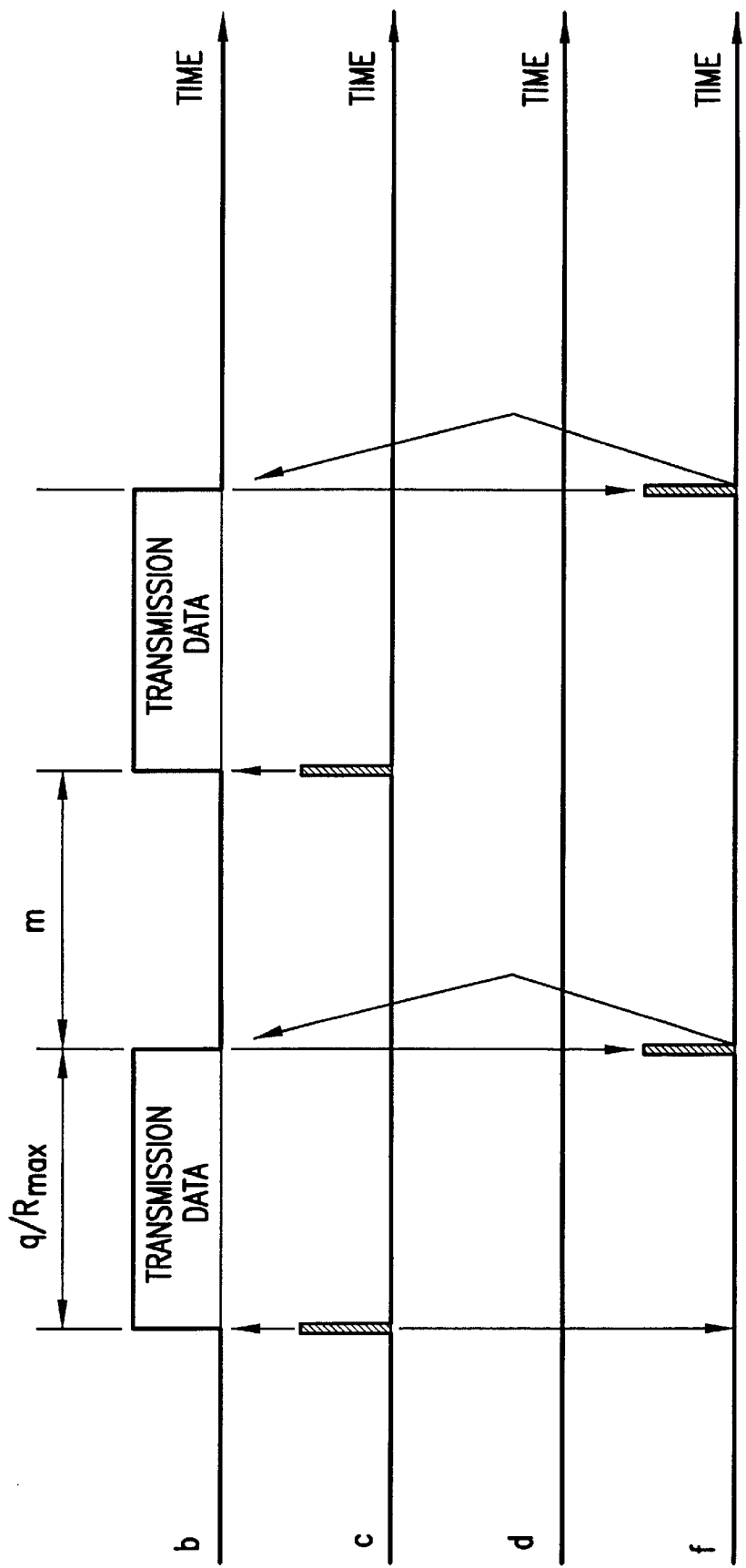
FIG. 12 is a diagram for describing the operation of the data transmitting means shown in FIG. 11.

The above-described operation will be explained with reference to a timing chart shown in FIG. 12. The transmission unit transmitting function 11 that has received a transmit start therein through the signal c, sends data corresponding to the q (bit). Simultaneously with this, the transmission unit length counting function 13 starts to count the length of the transmitted data. After completion of the above transmission, the transmission unit transmitting function 11 notifies a transmission end to the transmission unit length counting function 13 by the signal d. The transmission unit length counting function 13 notifies a counted value at this time to the transmission interval counting function 12 as the transmission unit length q (bit) by the signal f. The transmission interval counting function 12 counts the signal m (sec) using the q (bit) and thereafter notifies the transmission start to the transmission unit transmitting function 11 by the signal c. This operation is repeated subsequently.

Figure 13:
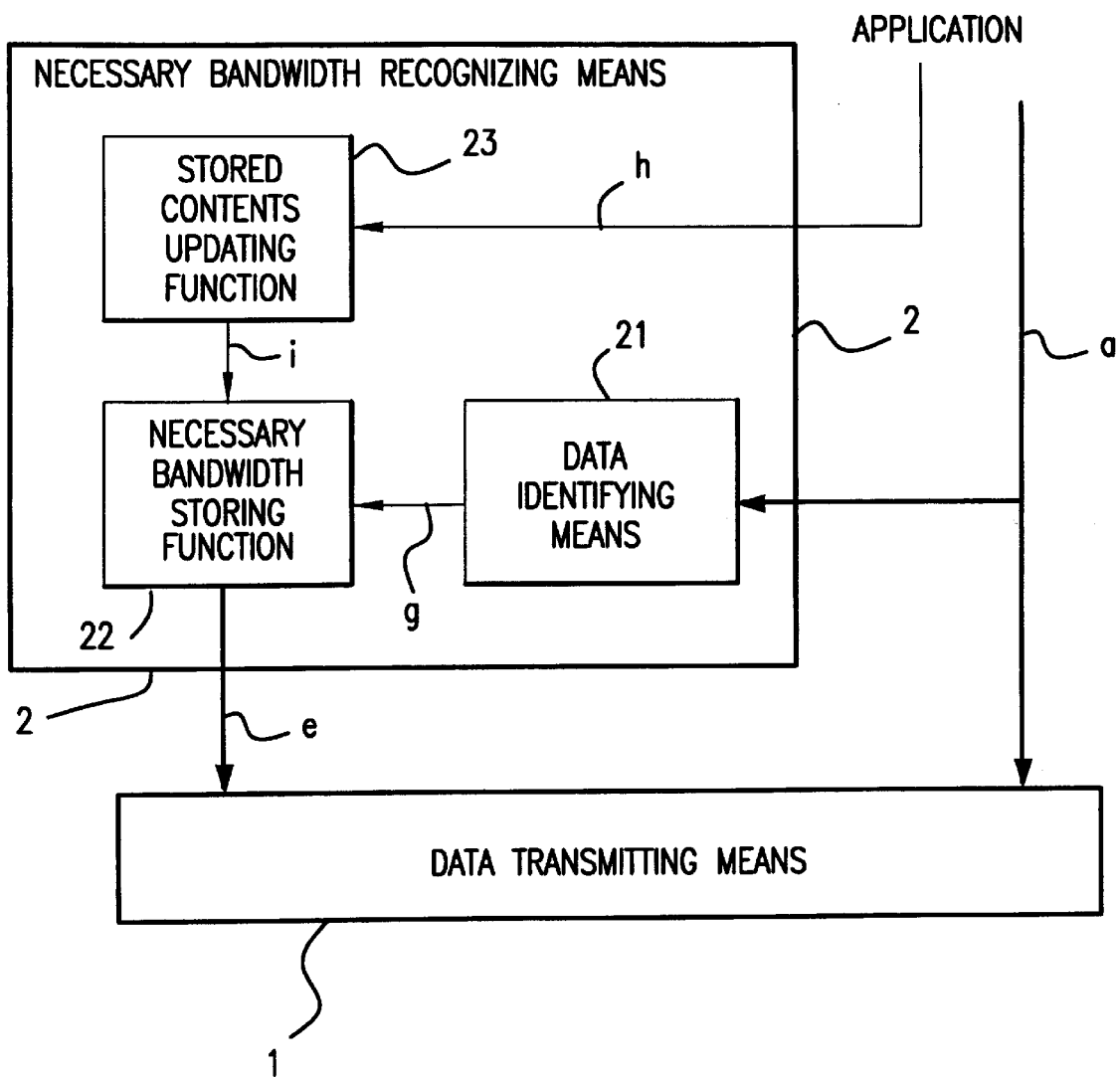
FIG. 13 is a block diagram illustrating a configuration of necessary bandwidth recognizing means employed in the second embodiment.

An example of a configuration of the necessary bandwidth recognizing means 2 will next be described with reference to FIG. 13. Referring to FIG. 13, the necessary bandwidth recognizing means 2 has a data identifying function 21, a necessary bandwidth storing function 22 and a stored-contents updating function 23.

Figure 14:
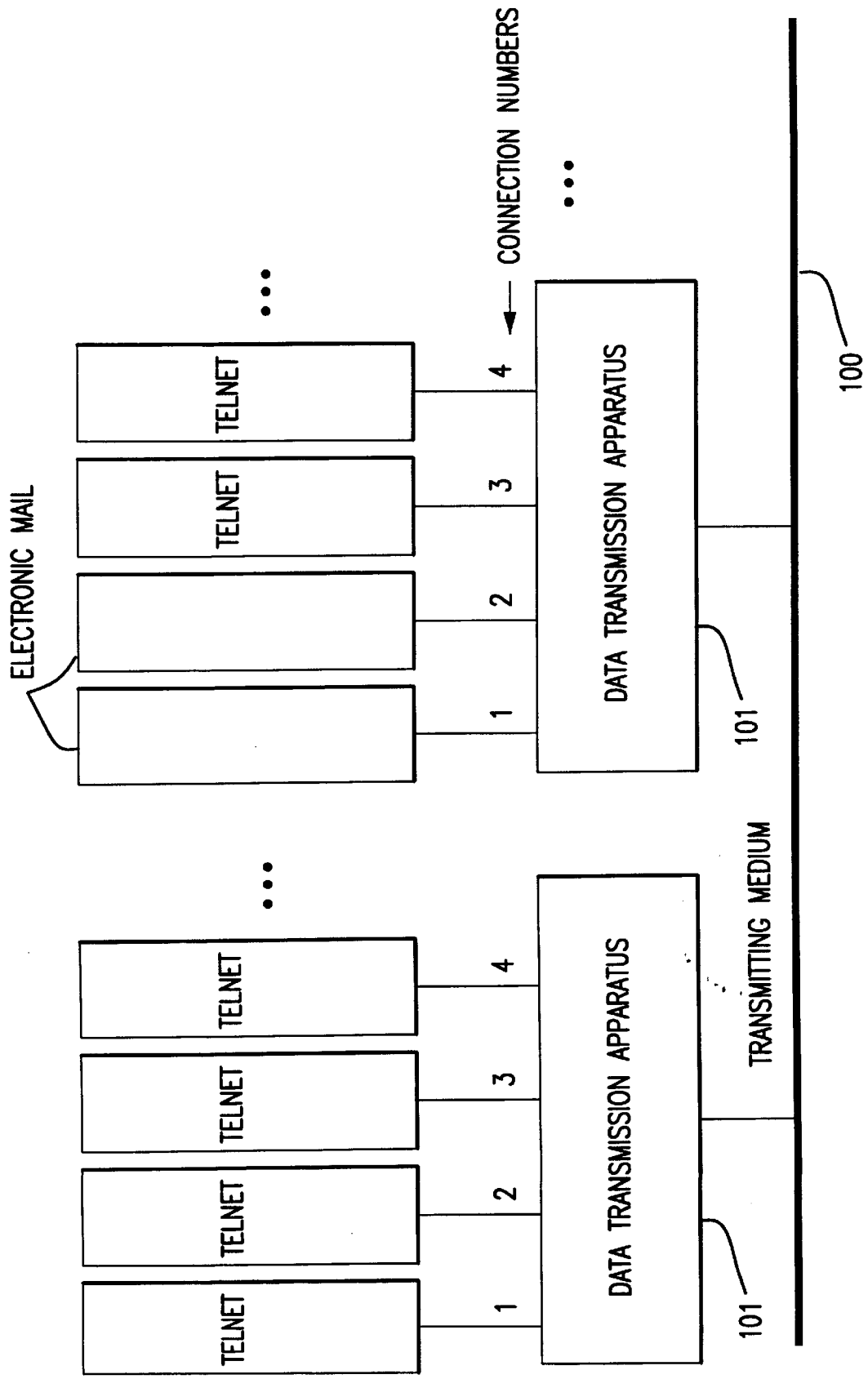
FIG. 14 is a diagram for describing connection numbers for data identifying means of the necessary bandwidth recognizing means employed in the second embodiment.

The data identifying function 21 monitors transmission data a delivered from an application and identifies a connection number for the transmission data a. Thereafter, the data identifying function 21 notifies the result of identification to the necessary bandwidth storing function 22 by a signal g. The term "connection number" means a number for identifying a logical connection between the transmitting side and the receiving side when each application uses it upon its data transmission. That is, since the type of protocol cannot draw a distinction between the same types of applications when the same types of applications transmit data simultaneously as shown in FIG. 14, the connection numbers are used to make a distinction between the data transmissions.

Figure 15:
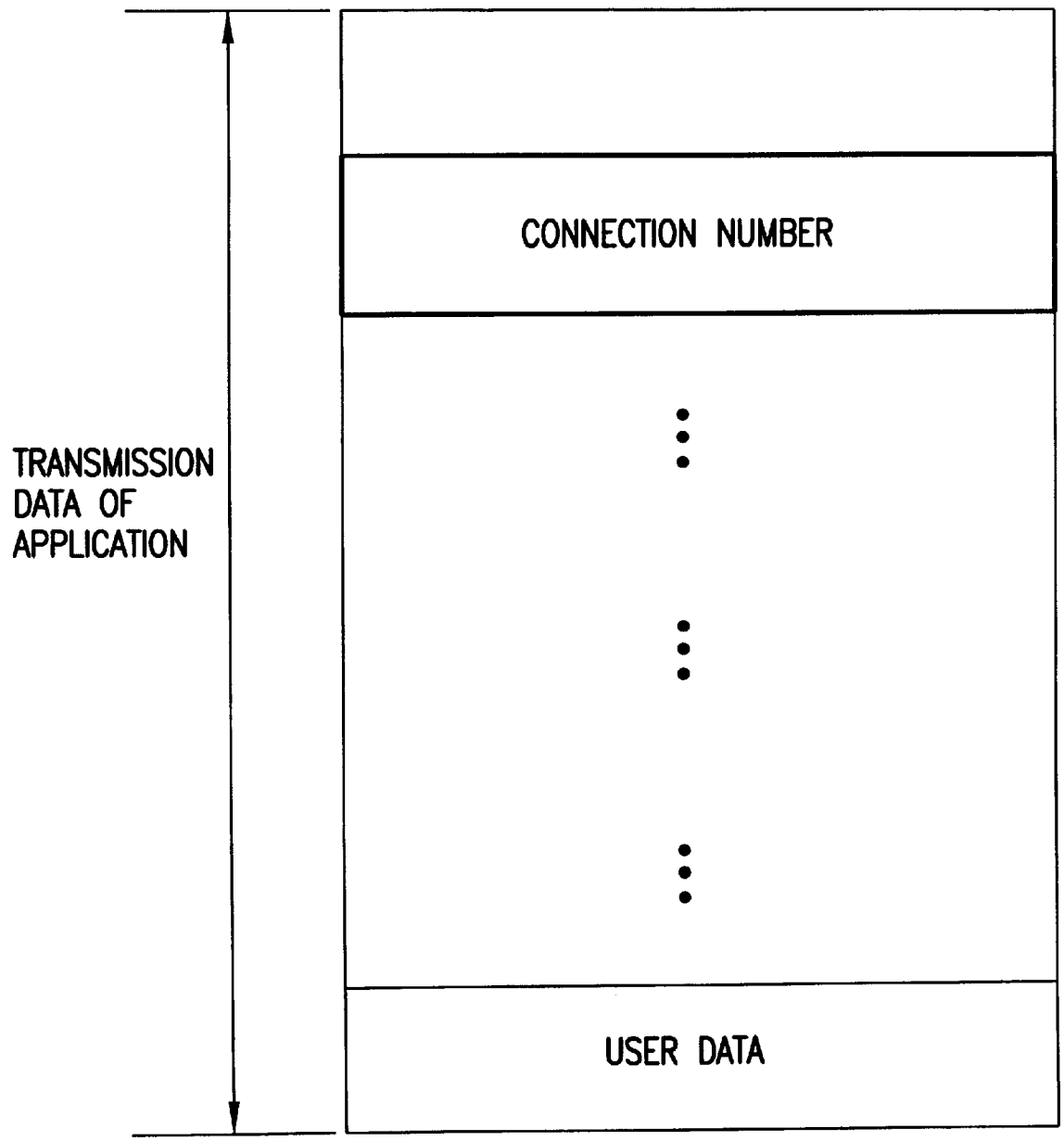
FIG. 15 is a diagram for describing the data identifying means of the necessary bandwidth recognizing means employed in the second embodiment.

Since these connection numbers are normally dynamically allocated from vacant numbers before transmitting, they are changed per every data transmission. As shown in FIG. 15, the position of each connection number can be specified based on the provisions or rules. Thus, the data identifying function 21 checks the transmission data a to identify whether the transmission data a has any one of the connection numbers.

As examples of the connection numbers,there are known a port number in an TCP, an IP address in an IP, VPI/VCI (Virtual Path Identification/Virtual Channel Identification) in ATM. The connection numbers will be explained specifically using the example of FIG. 9 referred to above. FIG. 9 shows the header for TCP/IP as one example of the actual transmission data. In the drawing, fields for a "SOURCE PORT" and a "DESTINATIONPORT" used by status shift protocols are defined in an TCP layer. The positions of the fields for these "SOURCE PORT" and "DESTINATION PORT" can be specified/according to the rules. Further, fields for a "SOURCE ADDRESS" and a "DESTINATION ADDRESS" are defined in an IP layer. The positions of the fields for these "SOURCE ADDRESS" and "DESTINATION ADDRESS" can be also specified according to the rules.

The stored-contents updating function 23 receives a connection number used for an application from the application through a signal h before the application starts its data transmission. Thus, the stored-contents updating function 23 makes the correspondence between the predetermined necessary bandwidth and connection numbers according to the type of application and updates the contents of the necessary bandwidth storing function 22 by a signal i.

Some applications may notify bandwidths requested from users in addition to connection numbers. When a user specifies a print end time, e.g, a printing application notifies its corresponding necessary bandwidth to the stored-contents updating function 23 by a signal h. At this time, the stored-contents updating function 23 associates the necessary bandwidth with a connection number and updates the contents of the necessary bandwidth storing function 22 by a signal i.

Further, other applications may notify their processing through puts (bps) in addition to connection numbers. When the processing speed of a printer is lower than or equal to Rmax, e.g., a printing application notifies its processing speed to the stored-contents updating function 23 by a signal h. At this time, the stored-contents updating function 23 defines the processing speed as a necessary bandwidth. Further, the stored-contents updating function 23 associates the necessary bandwidth with a connection number and brings the contents of the necessary bandwidth storing function 22 up to date by a signal i.

The necessary bandwidth storing function has already stored therein a table shown in FIG. 16, which is indicative of the correspondence between connection numbers and necessary bandwidth. When the data identifying function notifies a connection number to the necessary bandwidth storing function through a signal g, the necessary bandwidth storing function notifies a necessary bandwidth B corresponding thereto to the data transmitting means 1.

According to the present embodiment as described above, the connection number is judged by monitoring the transmission data delivered from the application. After the bandwidth requested from the user and the throughput of the application have been notified from the application, the bandwidth necessary for the data transmission is determined based on these. Thus, since a small bandwidth may simply be assigned to an application whose bandwidth may be small, the contention for the bandwidth can be controlled.

According to the present invention, as has been described above, even if plural types of applications for transmitting data at desired times exist and they transmit the data with a shared network, the respective applications transmit the data within necessary bandwidth. It is therefore possible to reduce the occurrence of contention between the data transmissions. Thus, the prevention of increases in data loss and data transmission delay can bring about an advantage that the quality of each application is ensured.

What is claimed is:

1. A data transmission apparatus comprising:
 identifying means for identifying an identifier of an application in a receiving side of a data transmission;
 storing means for storing the identifier of the application and a transmission bandwidth necessary for the application in relation to each other;
 transmission bandwidth extracting means for extracting the transmission bandwidth which is stored in said storing means and which corresponds to the identifier of the application identified by said identifying means;

sending interval determining means for determining a sending interval for transmitting a unit of data in accordance with the transmission bandwidth extracted by said transmission bandwidth extracting means; and data transmitting means for transmitting the unit of data in accordance with the sending interval determined by said sending interval determining means.

2. The data transmission apparatus according to claim 1, wherein the identifier of the application identified by said identifying means is an identifier of a protocol, and the transmission bandwidth necessary for the application is determined depending on a type of the protocol.

3. The data transmission apparatus according to claim 1, wherein the identifier of the application identified by said identifying means is input by a user, and the transmission bandwidth necessary for the application stored in said storing means is input by the user.

4. The data transmission apparatus according to claim 1, wherein the transmission bandwidth necessary for the application is determined in accordance with a throughput of the application.

5. The data transmission apparatus according to claim 1, wherein the identifier of the application identified by said identifying means is identified in accordance with a connection, and the transmission bandwidth necessary for the application is determined in accordance with the connection.

6. A data transmission method which stores in advance an identifier of an application and a necessary transmission bandwidth for the application in relation to each other, said data transmission method comprising:

determining the identifier of the application in a receiving side of a data transmission;

extracting the necessary transmission bandwidth corresponding to the identifier of the application;

determining a sending interval for a data transmission unit in accordance with the necessary transmission bandwidth; and transmitting the data transmission unit in accordance with the determined sending interval.

7. The method of claim 6, wherein the identifier of the application identifies a protocol for the application and the necessary transmission bandwidth is determined based on the identified protocol.

8. The method of claim 6, further comprising:

receiving the identifier of the application as input from a user; and receiving the necessary transmission bandwidth as input from a user.

9. The method of claim 6, wherein the identifier of the application and the necessary transmission bandwidth are determined in accordance with a connection.

10. A data transmission apparatus comprising:

a transmitter; and a necessary transmission bandwidth determination device that sends necessary bandwidth information corresponding to an identifier of an application in a receiving side of a data transmission to the transmitter, wherein the transmitter receives transmission data and divides the transmission data into plurality of transmission units corresponding to the identifier of the application determines transmission intervals for transmitting the transmission units based on the sent necessary transmission bandwidth information and transmits the transmission units in accordance with the determined transmission intervals.

11. The data transmission apparatus of claim 10, wherein the transmission data is received from at least one application and the necessary bandwidth determination device determines the necessary bandwidth information based on at least one of a type of protocol used by the at least one application, an input to the at least one application from a user, and a throughput of the at least one application.

12. The data transmission apparatus of claim 10, wherein the transmission units are of a fixed length.

13. The data transmission apparatus of claim 12, wherein the transmission interval is determined using the equation:

$$m=(p/B)-(p/R\max)$$

where m is the transmission interval, p is the length of the transmission unit, B is the necessary bandwidth, and Rmax is the maximum bandwidth of a transmitting medium being used to transmit the transmission data.

14. The data transmission apparatus of claim 10, wherein the necessary bandwidth determination device further comprises a required bandwidth table storage device that stores a required bandwidth table that identifies a correspondence between a type of protocol of the at least one application and a required bandwidth.

15. The data transmission apparatus of claim 10, wherein the transmission units are of an arbitrary length.

16. The data transmission apparatus of claim 15, wherein the transmitter further comprises:

a transmission interval counter;

a transmission unit length counter; and a transmission unit transmitter.

17. The data transmission apparatus of claim 16, wherein the transmission unit transmitter transmits a transmission unit when a start signal is received from the transmission interval counter, the transmission unit length counter begins counting a data transmission unit length when the start signal is received from the transmission interval counter, and the transmission unit length counter reports the transmission unit length back to the transmission interval counter when a transmission end signal is received from the transmission unit transmitter.

18. The data transmission apparatus of claim 17, wherein the transmission interval is determined based on the transmission unit length received from the transmission unit length counter and wherein the transmission interval counter sends the start signal to the transmission unit transmitter once the transmission interval has expired.

19. The data transmission apparatus of claim 10, wherein the necessary bandwidth information is determined based on a connection number of the transmission data.

20. The data transmission apparatus of claim 19, wherein the connection number is one of a port number, an IP address, and a Virtual Path Identification/Virtual Channel Identification.

* * * * *